United States Patent
Matton et al.

(10) Patent No.: US 9,834,734 B2
(45) Date of Patent: Dec. 5, 2017

(54) ACID GAS REMOVAL PROCESS BY ABSORBENT SOLUTION COMPRISING AMINE COMPOUNDS

(71) Applicant: Taminco, Ghent (BE)

(72) Inventors: Robin Matton, Merelbeke (BE); Bart Vandeputte, Hever (BE); Kristof Moonen, Hamme (BE); Klaas Victor, Beveren (BE)

(73) Assignee: Taminco BVBA, Ghent (BE)

( * ) Notice: Subject to any disclaimer, the term of this patent is extended or adjusted under 35 U.S.C. 154(b) by 0 days.

(21) Appl. No.: 15/312,036

(22) PCT Filed: May 22, 2015

(86) PCT No.: PCT/EP2015/061361
§ 371 (c)(1),
(2) Date: Nov. 17, 2016

(87) PCT Pub. No.: WO2015/177333
PCT Pub. Date: Nov. 26, 2015

(65) Prior Publication Data
US 2017/0081604 A1    Mar. 23, 2017

(30) Foreign Application Priority Data
May 23, 2014    (EP) ..................... 14169583

(51) Int. Cl.
*B01D 53/14* (2006.01)
*B01D 53/52* (2006.01)
(Continued)

(52) U.S. Cl.
CPC .......... *C10L 3/104* (2013.01); *B01D 53/1425* (2013.01); *B01D 53/1468* (2013.01);
(Continued)

(58) Field of Classification Search
None
See application file for complete search history.

(56) References Cited

U.S. PATENT DOCUMENTS 8,034,166 B2    10/2011  Asprion et al.
2006/0104877 A1   5/2006  Cadours et al.
(Continued)

FOREIGN PATENT DOCUMENTS

| CA | 2 861 539 | 11/2007 |
|---|---|---|
| EP | 2 036 602 | 3/2009 |
| EP | 2 283 911 | 2/2011 |

OTHER PUBLICATIONS

Chowdhury et al.; "Development of novel tertiary amine absorbents for $CO_2$ capture"; Energy Procedia; 1; (2009); pp. 1241-1248; Elsevier ScienceDirect.
(Continued)

*Primary Examiner* — Daniel Berns (57) ABSTRACT

Disclosed is a process for deacidising a non-aqueous feed comprising one of $H_2S$, $CO_2$, COS, $CS_2$, disulphides and/or mercaptans, comprising
a. an absorption step contacting the feed in countercurrent with an aqueous absorbent solution, forming a product reduced in the acid compounds and a liquid absorbent solution enriched with acid compounds,
b. a regeneration step treating the enriched solution from step a) to release acid compound, thereby forming a lean absorbent solution and a stream containing the acid compound, and
c. recycling at least part of the lean solution from step b) to step a), characterised in that step a) is performed at a pressure of at least 5.0 bar gauge, and the absorbent solution comprises an absorbent selected from N,N,N'-trimethyl-N'-(hydroxyethyl)-1,3-propanediamine, N-(3-aminopropyl)-N-(dim-
(Continued)

ethyl-amino)propyl-N',N'-dimethyl-1,3-propanediamine, and a mixture of methyl diethanol amine with tris(N,N,-dimethylamino propyl)amine in a weight ratio in the range of 25:75 to 95:5, and mixtures thereof.

27 Claims, 1 Drawing Sheet

(51) Int. Cl.
*B01D 53/62* (2006.01)
*B01D 53/77* (2006.01)
*B01D 53/78* (2006.01)
*B01D 53/96* (2006.01)
*C10L 3/10* (2006.01)

(52) U.S. Cl.
CPC ..... *B01D 53/1475* (2013.01); *B01D 53/1493* (2013.01); *B01D 53/52* (2013.01); *B01D 53/62* (2013.01); *B01D 53/78* (2013.01); *C10L 3/103* (2013.01); *B01D 2251/80* (2013.01); *B01D 2252/20431* (2013.01); *B01D 2252/504* (2013.01); *B01D 2257/304* (2013.01); *B01D 2257/504* (2013.01); *B01D 2258/0283* (2013.01); *C10L 2290/541* (2013.01)

(56) References Cited

U.S. PATENT DOCUMENTS

2009/0199709 A1 8/2009 Rojey et al.
2009/0264180 A1 10/2009 Roukis et al.

OTHER PUBLICATIONS

Notification of Transmittal of the International Search Report and the Written Opinion of the International Searching Authority dated Aug. 10, 2015 for International Application No. PCT/EP2015/061361.

ACID GAS REMOVAL PROCESS BY ABSORBENT SOLUTION COMPRISING AMINE COMPOUNDS

CROSS REFERENCE TO RELATED APPLICATIONS

This application is the national stage filing under 35 U.S.C. §371 of PCT/EP2015/061361, filed May 22, 2015, which claims priority to European Application EP 14169583.3, filed May 23, 2014, the contents of which are incorporated herein by reference in their entirety.

FIELD OF THE INVENTION

The present invention relates to a process for removing acid compounds from non-aqueous process streams, primarily gasses but also including liquids. More particularly, the invention relates to the use of an aqueous absorbent liquid for removing acid compounds, such as hydrogen sulphide ($H_2S$) and/or carbon dioxide ($CO_2$), from process streams which are at a pressure significantly above atmospheric pressure.

BACKGROUND OF THE INVENTION

The present invention is concerned with the capturing of acid compounds, such as carbon dioxide, from high pressure acid gasses, which is significantly different from the removal of carbon dioxide from flue gasses originating from the combustion of fossil fuels, such as for alleviating the greenhouse effect and addressing the global warming concerns associated with an increasing $CO_2$ content in the earth's atmosphere. There are major differences in the problems to be solved between the removal of $CO_2$ from flue gasses at about atmospheric pressures, and the deacidification of process streams, which are typically at pressures significantly higher than atmospheric. The particular problem with the deacidification of flue gasses is associated with the presence of oxygen, sulphur oxides and nitrogen oxides, and possibly even hydrogen chloride, HCl. Most absorbents will degrade relatively fast in the presence of oxygen. Sulphur oxides, nitrogen oxides and HCl will irreversibly react with most absorbents and form salts which are lost for the absorption. For instance EP 2036602 A1 is primarily concerned with the removal of $CO_2$ at approximately atmospheric pressure and a concentration of 10%, typical for flue gasses from fossil fuels.

The deacidification of process streams is sometimes also known as "sweetening", in particular when it concerns the removal of sulphur containing acid compounds such as $H_2S$ and/or mercaptans.

A wide variety of process streams containing acid compounds exists which are at above atmospheric pressures and from which it is desirable to remove at least part of the acid compounds in order to eliminate or reduce the problems which these acid compounds may cause downstream, and/or in order to recover the acid compounds for further use.

The acid compounds of concern for the present invention are hydrogen sulphide, $H_2S$, carbon dioxide, $CO_2$, carbon oxysulphide, COS, carbon disulphide, $CS_2$, disulphides and mercaptans.

Such process streams occur for example in the winning of natural gas. The gas from natural gas fields may contain significant amounts of carbon dioxide, readily up to 70% volume. Carbon dioxide and other acid compounds may therefore need to be removed in order to reduce further transportation costs as compressed gas, to mitigate risk of corrosion in downstream systems and pipelines, to adjust the heating value of the gas in order to suit the consumer needs, and/or to enable the liquefaction of the natural gas into liquefied natural gas, LNG, a means of transport of increasing use to bring natural gas from a remote winning location to the gas consumption market.

The removal of $H_2S$ and other sulphur containing compounds such as carbon oxysulphide, carbon disulphide and other disulphides, and mercaptans, may be important in an even much wider variety of circumstances. Acid rain concerns for example have continued to increase the pressure on further reducing the sulphur content of all combustion fuels, including gasses as well as liquids.

Acid compound removal may also be important in the production of synthesis gas, consisting primarily of $H_2$, CO and possibly also $N_2$, a gas which is in various forms an important chemical building block but also an important intermediate in the conversion of energy from solid carbon containing streams, such as solid waste streams, tar sands, oil shale and the like. It is usually desirable to remove $CO_2$ and if present also $H_2S$ from the synthesis gas, because the $CO_2$ may for instance act as a disturbing inert in the downstream process, and the $H_2S$ may be an undesirable reactant therein and/or lead to emission of sulphur oxides (SOx) upon combustion, undesirable in view of the acid rain concerns.

Acid compound removal is also important in the context of the refinery of petroleum. Refinery streams such as the liquefied petroleum gas (LPG) fraction, the offgasses from fluid catalytic cracking (FCC), the hydrotreater offgasses, and the refinery gas usually contain significant amounts of $H_2S$ and/or mercaptans, and in some also $CO_2$ may be present. The distillation fractions intended for the different fuel pools need to be desulphurized in order to alleviate the acid rain problem caused by SOx-emissions in the flue gas after combustion. Several of these liquid fractions are therefore subjected to hydrodesulphurization, a refinery step which converts the heavier sulphur compounds into gaseous $H_2S$. In a so-called Claus plant, the $H_2S$ which is collected from all these sources may then be converted into elemental sulphur, which has become a product of commerce, for instance as feedstock for the production of sulphuric acid.

The removal of acid compounds from gasses, and to a lesser extent also from organic liquids such as for instance LPG streams, is typically performed by washing the stream with an absorbent solution, usually at a relatively low temperature in order to favour the absorption of the acid compound. The absorbent solution contains absorbents of a basic nature, and amine compounds have been preferred over alternatives such as hot potassium carbonate. Even more preferred were alkanol amines. A conventional absorbent is for instance 2-hydroxyethyl amine, also known as monoethanol amine (MEA). The acid compounds absorbed react with the alkanolamine present in solution according to a reversible exothermic reaction. With MEA, typically two molecules of MEA are required to absorb one molecule of $CO_2$. More complex, sterically hindered amines, including tertiary amines, were found to provide improved stoichiometry.

A major portion of the acid compound is absorbed in the absorbent solution, and the rich absorbent solution is then routed to a regeneration step for being regenerated, usually at higher temperatures and lower pressures compared to the absorption step, typically the regenerator being a tower having a reboiler at the bottom and/or with vapour stripping, preferably steam stripping. In the regeneration step, the acid compounds are released into the vapour phase, which is separated off. After condensation and reflux of most of the water in the vapour leaving the tower, the acid compounds may become available at relatively high concentrations. The hot lean absorbent solution from the regenerator bottom is then usually cooled and recycled to the absorption step. Typically, a heat exchange between the lean absorbent solution being cooled and the rich absorbent solution being heated is included in the cycle.

A major problem with such absorption-regeneration cycle for acid compound removal is the amount of energy required, primarily for the regeneration step. The thermal energy required for the regeneration may be split in three parts linked with (i) heating of the absorbent solution between the absorption stage and the regeneration stage, i.e. the sensible heat of the absorbent solution, (ii) its vaporization heat, and (iii) the binding energy between the absorbed species and the absorbent solution.

The binding energy between the absorbed species and the absorbent solution is higher when the affinity between the solvent compounds and the acid compounds to be removed is high. It is more expensive to regenerate a very basic primary alkanolamine such as MEA than a tertiary amine such as bis(2-hydroxyethyl)-methylamine, also known as methyl diethanol amine (MDEA). Without wanting to be bound to this theory, this difference may for instance be due to that in aqueous solutions $CO_2$ and unhindered primary and secondary amines are believed to form stable carbamate anions, while hindered tertiary amines may primarily form bicarbonate ions. This would favour tertiary amines, but other differences such as mass transfer rates and absorption kinetics may direct into the opposite direction.

The vaporisation heat of the absorbent solution is also important because the thermal regeneration step requires vaporisation of a significant fraction of the absorbent solution in order to obtain the stripping effect which favours elimination of the acid compounds from the absorbent solution. The absorbent solution fraction to be vaporised is proportional to the extent of the association between the absorbed acid compound and the absorbent solution. However, an easily vaporisable absorbent solution brings the drawback that more of the absorbent solution may be entrained in the gas stream leaving the absorber overhead, i.e. with the stream from which the acid compounds have been removed.

The sensible heat part is essentially linked to the absorption capacity of the absorbent solution. It is proportional to the flow rate of the absorbent solution being regenerated.

In this context, the search for the ideal absorbent compound has become complex, and has been concerned with a.o. the following criteria:

the selectivity towards acid compounds in relation to other compounds in the feed stream to be treated, such as hydrocarbons, hydrogen and carbon monoxide, in the case of streams such as natural gas, synthesis gas and/or refinery gasses, the rate of absorption of the different acid compounds of interest, the absorption capacity for the different acid compounds of interest, as this may suggest an increase of the absorbent concentration in the absorbent solution, the solubility of the absorbent into the solvent or solvent cocktail should be sufficiently high —hence the option to also study the solvent phase —and the viscosity of the concentrated absorbent solution should remain limited, as well as its corrosive behaviour, the heat of reaction in the absorption step, which relates to the temperature increase of the absorption solution in the absorption step and also to the heat required for again releasing the acid compound in the regeneration step, as discussed above, thermal stability, in relation to maintaining its chemical integrity at the conditions which govern the more severe regeneration step, low vapour pressure, in order to limit the losses of absorbent in the deacidified stream leaving the absorption step in case the feed stream to be treated is a vapour stream.

CA 2861539 A1, also published as U.S. Pat. No. 8,034,166 B2, proposes to use an absorbent comprising at least one amine and at least one aminocarboxylic acid and/or aminosulfonic acid, for removing carbon dioxide from a gas stream. A wide variety of, amines is proposed, all very conventional and typically comprising at least one primary or secondary amine group. Only monoethanol amine was exemplified, each time in mixture with N,N-dimethylglycine or 2-methylalanine as the amino acid in the absorbent medium. The examples were showing the absorption of $CO_2$ from flue gas at 1 bar absolute pressure. The objective in CA 2861539 was to reduce the steam consumption in the regeneration step.

In search of a reduction of the energy requirement of the absorption-regeneration cycle associated with deacidification, US 2006/0104877 A1 proposes to use an absorbent solution which forms two separable liquid phases when it absorbs an amount of acid compounds, such that only the phase laden with acid compounds needs to be regenerated. The drawback of this proposal requires extra process steps above the conventional deacidification process, and therefore extra process equipment is required.

US 2009/0264180 A1 proposes a variation of this liquid phase separation concept, in which a strong acid such as phosphoric acid is added, in a process using an absorbent having at least two amine functions, in order to further enrich the liquid phase which should be regenerated with acid compounds, and to separate off unreacted reactive absorbent compounds before the regeneration. The document further suggests adding salts to the absorbent solution so as to favour the phenomenon of separation of the absorbent solution into two phases. Also here, extra process steps and associated equipment are required.

US 2009/0199709 A1 proposes an absorption solution which separates into two liquid phases when it has absorbed and amount of acid compounds and when it is heated. Again, this proposal requires extra process steps and associated equipment over and above the conventional deacidification equipment.

There therefore remains a need for an absorbent solution which exhibits excellent performance in a conventional absorption-regeneration cycle but which does not exhibit the separation into two liquid phases when being loaded with acid compounds at any of the temperatures occurring in the process cycle.

The present invention aims to obviate or at least mitigate the above described problem and/or to provide improvements generally.

SUMMARY OF THE INVENTION

According to the invention, there is provided a deacidification process involving a particular absorption solution and a use of the solution for deacidification as defined in any of the accompanying claims.

The present invention provides a process for deacidising a feed stream selected from a gaseous and an organic liquid stream comprising at least one acid compound of the group consisting of hydrogen sulphide, H$_2$S, carbon dioxide, CO$_2$, carbon oxysulphide, COS, carbon disulphide, CS$_2$, disulphides and mercaptans, the method comprising a. an absorption step wherein the feed stream is contacted in countercurrent with an aqueous absorbent solution and forming a product stream having a reduced acid compound content and a liquid absorbent solution enriched with the at least one acid compound, b. a regeneration step wherein the enriched absorbent solution obtained from step a) is treated to release at least part of the acid compound, thereby forming a regenerated liquid absorbent solution lean in the acid compound and a gaseous stream containing the at least one acid compound, and c. recycling at least part of the lean absorbent solution from step b) as at least part of the aqueous absorbent solution to step a), characterised in that step a) is performed at a pressure of at least 5.0 bar gauge, and the absorbent solution comprises an absorbent selected from the group consisting of N,N,N'-trimethyl-N'-(hydroxyethyl)-1,3-propanediamine, N-(3-aminopropyl)-N-(dimethylamino)propyl-N',N'-dimethyl-1,3-propanediamine, and a mixture of methyl diethanol amine, MDEA, with tris(N,N,-dimethylamino propyl)amine in a weight ratio in the range of 25:75 to 95:5, and mixtures thereof.

The absorption step is performed with the feed stream and the aqueous absorbent solution in countercurrent. This means that the two streams enter the absorption step at opposite ends. It also means that the two streams are immiscible with each other. A first advantage is that the product stream having a reduced acid compound is leaving the absorption step when it had just been in contact with the absorbent solution containing as at least a part, the at least part of the lean absorbent solution which is recycled from the regeneration step b). This brings the effect that the acid compound concentration in the product stream may be reduced as much as possible. A second advantage is that the liquid absorbent solution enriched with the acid compound is leaving the absorption step when it has just been in contact with the feed stream comprising the acid compound. This brings the effect that the acid compound concentration in the enriched absorbent solution has been increased as much as possible.

It is clear to the person skilled in the art that the absorption step a) in the method according to the present invention includes a separation of streams. At the one end of the absorption step, there is a separation of the liquid absorbent solution enriched with the acid compound from the feed stream with which it has been last in contact. At the opposite end of the countercurrent absorption step, there is a separation of the product stream having a reduced acid compound content from the incoming aqueous absorbent solution with which it has been last in contact. The purpose of the invention to deacidise a feed stream selected from a gaseous and an organic liquid stream by absorption of the acid compound into an aqueous absorbent solution. The feed gas or organic liquid stream is by definition immiscible with the aqueous absorbent solution. The deacidising process would otherwise simply not be operable. The countercurrent absorption step is clearly illustrated by absorption tower 1 in FIG. 1, which inherently includes the two stream separations in the tower top and in the tower bottom.

In another embodiment, the present invention provides the use of an absorbent solution comprising an absorbent selected from the group consisting of N,N,N'-trimethyl-N'-(hydroxyethyl)-1,3-propanediamine, N-(3-aminopropyl)-N-(dimethylamino)propyl-N',N'-dimethyl-1,3-propanediamine, and a mixture of methyl diethanol amine, MDEA, with tris(N,N,-dimethylamino propyl)amine in a weight ratio in the range of 20:80 to 95:5, and mixtures thereof, for deacidising at a pressure of at least 5.0 bar gauge a feed stream selected from a gaseous and an organic liquid stream comprising at least one acid compound of the group consisting of hydrogen sulphide, H$_2$S, carbon dioxide, CO$_2$, carbon oxysulphide, COS, carbon disulphide, CS$_2$, hydrogen cyanide, HCN, disulphides and mercaptans.

In yet another embodiment, the present invention provides for an aqueous absorbent solution comprising at least one absorbed acid compound of the group consisting of hydrogen sulphide, H$_2$S, carbon dioxide, CO$_2$, carbon oxysulphide, COS, carbon disulphide, CS$_2$, hydrogen cyanide, HCN, disulphides and mercaptans, the absorbent solution comprising an absorbent selected from the group consisting of N,N,N'-trimethyl-N'-(hydroxyethyl)-1,3-propanediamine, N-(3-aminopropyl)-N-(dimethylamino)propyl-N',N'-dimethyl-1,3-propanediamine, and a mixture of methyl diethanol amine, MDEA, with tris(N,N,-dimethylamino propyl)amine in a weight ratio in the range of 20:80 to 95:5, and mixtures thereof, with the proviso that, if N,N,N'-trimethyl-N'-(hydroxyethyl)-1,3-propanediamine is the only absorbent present in the solution and CO$_2$ is the only absorbed acid compound comprised in the solution, the solution contains at least 36 grams of CO$_2$ per litre of solution.

We have found that the absorbents according to the present invention bring the advantage that a separation of the absorbent solution into two liquid phases may readily be avoided at the process conditions and the acid compound loadings occurring in the absorption-regeneration cycles which are known in the art. For instance, we have found that an absorbent solution containing tris(N,N-dimethylamino propyl)amine as the absorbent may readily lead to separation of the solution into two liquid phases, but that the addition of methyl diethanol amine, MDEA, in the proportions as specified, may avoid such phase separation problems. Separation of the absorbent solution into two liquid phases causes severe operational problems if the process and its equipment is not suited to handle the two phases.

A separation of the absorbent solution into two separate liquid phases, in a deacidification cycle which is not foreseen to handle the separate liquid phases, may cause a variety of problems. Liquid phase separation may readily upset the vapour-liquid equilibrium which is very important in the performance of the deacidification cycle, in particular in the regeneration step. Liquid phase separation readily causes sudden changes in the composition of the liquid flows in the cycle, such that the process becomes highly unstable, its control impossible, and its performance erratic.

We have further found that the partial replacement of tris(N,N,-dimethylamino propyl)amine by MDEA in an absorbent solution reduces the viscosity of the absorbent solution, which brings the advantage that less pumping energy is required in order to pump around the typically high volumes of absorbent solutions through the deacidification cycle, but also brings the extra advantage of improving the mass transfer of the acid compounds from the feed stream into the absorbent solution.

The absorbents according to the present invention preferably are polyamines. It has been found that polyamines offer the advantage compared to monoamines of a higher number of reactive sites per unit weight of compound, with the potential of a higher absorption capacity. We also prefer to build some distance between the different amino groups in the same absorbent molecule, for instance by introducing one or more carbon atoms. The absorbents according to the present invention all have 3 carbon atoms in between two adjacent nitrogen atoms in the molecule. We have found that this feature reduces the risk for interference problems between the two N-containing functional groups.

We have further found that the absorbents according to the present invention bring the advantage of having a relatively low heat of reaction with the acid compounds, in particular with $CO_2$. This reduces the heat generation in the absorber, and beneficially affects the energy requirement in the regeneration step.

The amines used in accordance with the present invention have substantially all tertiary amine groups. Tertiary amine groups bring the advantage to be more stable thermally and chemically under the typical operating conditions in the gas treatment process.

We have further found that the absorbents according to the present invention bring the advantage of having a high boiling point, all being higher than 200° C. This reduces any losses of the absorbent from the process through evaporation, thereby reducing the amine make-up costs as well as any possible nuisances the losses may cause downstream from the process according to the present invention. The boiling points of the selected absorbents are the following:

| Compound | Boiling point (° C.) |
|---|---|
| Methyl diethanol amine (MDEA) | 247 |
| N,N,N'-trimethyl-N'-(hydroxyethyl)-1,3-propanediamine | 226 |
| tris(N,N,-dimethylamino propyl)amine | 285 |
| N-(3-aminopropyl)-N-(dimethylamino)propyl-N',N'-dimethyl-1,3-propanediamine | 296 |

The absorbents proposed for the process according to the present invention are all fully water soluble. This brings the advantage that phase separation at more elevated temperatures may be avoided.

The absorbents according to the present invention have a limited corrosivity towards carbon steel. Using conventional carbon steel for constructing the process equipment therefore may still offer quite acceptable process life of the equipment.

The absorbents according to the present invention also offer an acceptable toxicity profile, which brings the advantage of reduced environmental, industrial hygiene and/or safety risks.

The absorbents according to the present invention also have a low foaming tendency, thus avoiding or at least reducing the risk for process upsets due to foaming, which may have devastating effects.

The absorbents according to the present invention also show a low hydrocarbon absorption, which brings the advantage of a higher process selectivity towards the acid compounds.

We have further found that the absorbents according to the present invention may be used at high concentrations in the absorbent solution, and this without causing problems such as liquid phase separation, increased viscosity, etc. . . . .

We have further found that the absorbents according to the present invention are able, in the high pressure absorption steps according to the present invention, to achieve particularly high acid loadings with the selected acid compounds to be removed from the higher pressure feed streams according to the present invention. We have found that the selected absorbents are able to reach acid loadings which are at least 20% higher than this of an absorbent solution having a comparable concentration of MDEA as the absorbent, accelerated with piperazine at a range of 5-10% by weight. The improved acid loadings could become even significantly higher than 20% depending on the test conditions. Together with the high absorbent concentrations which are possible with the absorbents according to the present invention, this brings a significant advantage in terms of effectiveness of the acid compound removal process in terms of the amount of absorbent solution which needs to be circulated and the energy required for regeneration of the absorbent solution.

The advantages of using high-load solvents in acid gas removal are significant. High-load solvents bring a high absorption capacity, and thereby reduce solvent circulation rates. Lower solvent circulation rates allow the use of absorbers having smaller diameters, and also allow to reduce the size of other equipment such as lean-rich heat exchangers, lean solvent coolers, solvent pumps, and flash vessels. Lower solvent circulation rates further allow a reduced consumption of steam and cooling water, and of electrical power.

The finding of the present invention is contrary to the disclosure by Chowdhury, F. A. et al, in "Development of novel tertiary amine absorbents for $CO_2$ capture", Energia Procedia 1 (2009), pp. 1241-1248, Elsevier ScienceDirect. This document is concerned with the separation of $CO_2$ from flue gasses of fossil fuels, and investigated twenty five tertiary amines with different chemical structures as $CO_2$ absorbent candidates, in comparison with N-methyl diethanolamine (MDEA) as the reference standard. The document included N,N,N'-trimethyl-N'-(hydroxyethyl)-1,3-propanediamine, listed as N,N,N'-TMPDA-EO and as compound number 17, in the screening tests, which investigated the $CO_2$ loading capacities and absorption/desorption rates with time. In the first screening tests, this particular molecule underperformed on almost all criteria, on many accounts even far below the performance of the standard reference MDEA. The molecule was therefore rejected for the rest of the study. This document thus suggests that N,N,N'-trimethyl-N'-(hydroxyethyl)-1,3-propanediamine is a poor absorbent candidate for $CO_2$ absorption, significantly underperforming the conventional candidate MDEA. The document is clearly unaware that the same molecule may be able to achieve high loadings under conditions differing from the removal of $CO_2$ from flue gasses.

We have further found that the absorbent solutions according to the present invention are less prone to foam formation as compared to other conventional absorbent solutions, such as for instance those which are based primarily on a combination of MDEA with sulpholane, more specifically 2,3,4.5-tetrahydrothiophene-1,1-dioxide.

DETAILED DESCRIPTION

The present invention will be described in the following with respect to particular embodiments and with reference to certain drawings but the invention is not limited thereto but only by the claims. Any drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Accordingly, the terms "comprising" and "including" encompass the more restrictive terms "consisting essentially of" and "consisting of".

In an embodiment of the method according to the present invention, the lean absorbent solution contains from 20 to 60% by weight of the absorbent, preferably at least 25%, more preferably at least 30%, even more preferably more than 30%, yet more preferably at least 32% by weight of the absorbent, preferably at least 35%, more preferably at least 40%, even more preferably at least 45% of the absorbent, preferably at least 50% by weight of the adsorbent. The applicants have found that very high absorbent concentrations may be used with the selected absorbents. This brings the advantage that the absorption cycle may be operated at high efficiency, meaning a low circulation rate of the absorbent solution for the amount of acid compounds which is removed, in comparison with the known and conventional absorbents.

In an embodiment of the method according to the present invention, the lean absorbent solution further comprises an accelerator for the reaction of the absorbent with at least one of the acid compounds, preferably the accelerator being selected from the group consisting of primary amines and secondary amines, more preferably secondary amines. The accelerator brings a clear improvement of the kinetics of the system, absorption rates are faster, loading amounts are higher, solvent/gas ratios are lower, design of the plant may be smaller and the regeneration heat requirement may be lower, resulting in less cooling capacity. This may thus result in a lower liquid/gas ratio, which may result in a smaller design of the plant, absorber as well as regenerator. Alternatively, when using the same liquid/gas ratio, an often considerably larger amount of acid compounds may be removed. In addition, with an accelerator, in particular in combination with a sulpholane as discussed herein below, more acid compound may be flashed at a relatively high pressure when compared with similar chemical absorbents. This reduces re-compression requirements, e.g. for re-injection of carbon dioxide into a natural gas containing underground formation.

In an embodiment of the method according to the present invention wherein an accelerator is used, the lean absorbent solution contains 0.5 to 40% by weight of the accelerator, preferably at least 1.0%, more preferably at least 2.0%, even more preferably at least 3.0%, preferably at least 4.0%, more preferably at least 5.0%, yet more preferably at least 6.0% by weight and either alternatively or in combination therewith at most 35% by weight, preferably at most 30%, more preferably at most 25%, even more preferably at most 20%, preferably at most 15%, more preferably at most 10.0%, even more preferably at most 9.0%, yet more preferably at most 8.0% by weight. The applicants have found that the accelerator is most effective at the specified concentrations.

In an embodiment of the method according to the present invention, the accelerator is selected from the group consisting of amines, alcohols, ketones, vinyl alcohols, vinyl ketones, ether alcohols, ether ketones, glycols, polyethylene glycols, polypropylene glycols, ethylene glycolpropylene glycol copolymers, glycol ethers, thioglycols, thioalcohols, sulfones, sulfoxide, N-alkylated pyrrolidones, N-alkylated piperidones, cyclotetramethylenesulfones, N-alkylformamides, N-alkylacetamides, alkyl phosphates, alkylene carbonates and/or dialkyl carbonates. More preferred candidates are monoethanol amine (MEA), diethanol amine (DEA), monomethyl ethanolamine (MMEA), piperazine, 2-methylpiperazine, N-methyl piperazine, N-ethyl piperazine, N-hydroxyethyl piperazine (HEP), N-(2-aminoethyl) piperazine, homopiperazine, piperidine and morpholine. Most preferred as accelerator is piperazine.

In an embodiment of the method according to the present invention, the absorbent solution comprises a mixture of methyl diethanol amine, MDEA, with tris(N,N,-dimethylamino propyl)amine in a weight ratio in the range of at least 27:73, preferably at least 30:70, more preferably at least 35:65, even more preferably at least 40:60 and/or at most 90:10, preferably at most 80:20, more preferably at most 70:30, even more preferably at most 60:40, yet more preferably at most 50:50, preferably at most 45:55. The applicants have found, within the specified ranges of the ratio, that the separation of the liquid absorbent solution into two separate liquid phases may readily be avoided, thereby avoiding the problems mentioned herein above.

In an embodiment of the method according to the present invention, the lean absorbent solution further comprises a substituted or unsubstituted (cyclo-)tetramethylene sulphone or sulpholane, preferably 2,3,4,5-tetrahydrothiophene-1,1-dioxide, also known as tetrahydrothiophene-1,1-dioxide, and this preferably in a concentration in the range of from 2 to 60% by weight, preferably at least 5% by weight, more preferably at least 10%, even more preferably at least 15% by weight, yet more preferably at least 20% by weight, and optionally at most 55% by weight, more preferably at most 50%, even more preferably at most 40%, preferably at most 30%, more preferably at most 25% by weight, even more preferably at most 20% by weight, based on the total absorbent solution. The applicants have found that these sulphones contribute significantly in the absorption of mercaptans.

The (cyclo-)tetramethylene sulphones which are suitable are well known in the art, the unsubstituted compound also being known as sulpholane. Suitable sulpholanes include those containing only from zero to two substituent radicals and these are alkyl from 1 to 4 carbon atoms, with a total of 4 alkyl carbon atoms, the alkyl radicals being attached to different ring carbon atoms. Preferred substituted sulpholanes are those having methyl substituents. Representative substituted sulpholanes are 2-methyl sulpholane, 3-methyl sulpholane, 2,3-dimethyl sulpholane, 2,4-dimethyl sulpholane, 3,4-dimethyl sulpholane, 3-ethyl-sulpholane and 2-methyl-5-propyl sulpholane.

The applicants have found that the sulphones act as a so-called "physical" solvent, contrary to the N-containing compounds which are considered "chemical" solvents. The presence of a "physical" solvent is that the energy of the bond with the acid compound is typically smaller than with most of the typical so-called "chemical" solvents. This improves the performance in several aspects: it reduces the heating in during the absorption step, and reduces the energy needed to break the bond in the regeneration step. These sulpholanes perform very well at high pressures, especially from 20 to 90 bar absolute. The applicants prefer to use the physical solvent in combination with an accelerator, as discussed hereinabove, preferably piperazine.

In an embodiment of the method according to the present invention, step a) is performed at a pressure of at least 7.0 bar gauge, preferably at least 9.50 bar gauge, more preferably at least 10.0 bar gauge, even more preferably at least 15 bar gauge, yet more preferably at least 20 bar gauge. The applicants have found that the absorbents according to the present invention are particularly effective and efficient under these higher absorbent pressures as specified.

In an embodiment of the method according to the present invention, step a) is performed at a pressure of at most 150 bar gauge, preferably at most 120 bar gauge. The applicants have found that higher pressures do not bring much further improvements of performance of the absorption step. The applicants have found that, if the feed stream needs to pressurized in order to prepare it for the absorption step, that further compression energy to reach pressures above the specified levels is usually not justified by the additionally obtainable benefits.

In an embodiment of the method according to the present invention, the feed stream comprises carbon dioxide, and the partial pressure of $CO_2$ in the feed stream to step a) is at least 50 kPa, preferably at least 100 kPa, more preferably at least 150 kPa, even more preferably at least 200 kPa, yet more preferably at least 250 kPa, preferably at least 300 kPa, more preferably at least 400 kPa, even more preferably at least 500 kPa, yet more preferably at least 600 kPa. The applicants have found that the absorbents according to the present invention are particularly effective for removing carbon dioxide.

In an embodiment of the method according to the present invention, the sum of the partial pressures of the acid compounds in step a) is at least 50 kPa, preferably at least 100 kPa, more preferably at least 150 kPa, even more preferably at least 200 kPa, yet more preferably at least 250 kPa, preferably at least 300 kPa, more preferably at least 400 kPa, even more preferably at least 500 kPa, yet more preferably at least 600 kPa. The applicants have found that the absorbents according to the present invention are particularly effective for removing acid compounds when these are offered to step a) at the higher partial pressures as specified.

In an embodiment of the method according to the present invention, the feed stream is a gas stream which comprises at most 4.5% by volume of oxygen, $O_2$, preferably at most 4.0%, more preferably at most 3.0%, even more preferably at most 2.0%, more preferably at most 1.0%, more preferably at most 0.5% of oxygen by volume, even more preferably at most 0.1% by volume of oxygen. The applicants have found that this reduces oxidative degradation of the absorbents in the solution, such that the performance of the absorbent solution remains high over a longer period of time, less make-up of fresh absorbent is required in order to maintain its performance, either in terms of amount or in terms of frequency of addition. A further advantage is that the absorbent solution may remain in operation for a longer period before it has to be discarded or recycled to a clean-up step for removal of the degradation products.

In an embodiment of the method according to the present invention, the feed stream is a gas stream which comprises at most 2.0% by volume of compounds selected from sulphur oxides, SOx, nitrogen oxides, NOx, hydrogen chloride, HCl, and mixtures thereof, preferably at most 1.5%, more preferably at most 1.0%, even more preferably at most 0.5% of SOx and/or NOx and/or HCl by volume. The applicants have found that these compounds have a tendency to react with the absorbents according to the present invention in a rather irreversible way, usually forming compounds which are not anymore available for the absorption/regeneration steps of the deacidification process.

In an embodiment of the method according to the present invention, the feed stream comprises at most 80% by volume of nitrogen, N2, preferably less than 80%, more preferably at most 70%, even more preferably at most 60%, yet more preferably at most 50%, preferably at most 40%, more preferably at most 30% nitrogen, even more preferably at most 25% by volume of nitrogen, preferably at most 22% by volume, more preferably at most 20%, even more preferably at most 15%, yet more preferably at most 10% of nitrogen by volume. In most processes, nitrogen is considered an inert without any further usefulness. The applicants therefore prefer to treat feed streams which contain only limited amounts of nitrogen.

In an embodiment of the method according to the present invention, the feed stream comprises at least 5% by volume of combustible components, preferably at least 10% by volume, more preferably at least 20% by volume, even more preferably at least 30% by volume, yet more preferably at least 50% by volume of combustible components. This brings the advantage, after removal of the acid compounds, that the product stream is of high value already for its content of combustion energy, or its calorific value, alone.

In an embodiment of the method according to the present invention, the feed stream comprises at least 5% by weight of combustible components, preferably at least 10% by weight, more preferably at least 20% by weight, even more preferably at least 30% by weight, yet more preferably at least 50% by weight of combustible components. This brings the same advantage, i.e. after removal of the acid compounds, that the product stream is of high value already for its content of combustion energy, or its calorific value, alone.

In an embodiment of the method according to the present invention, the lean absorbent solution is recycled to step a) at a temperature in the range of 20-60° C., preferably at most 55° C., more preferably at most 50° C., even more preferably at most 45° C., preferably at most 40° C., more preferably at most 35° C., even more preferably at most 30° C. The applicants have found that these temperatures are more suitable for reaching the higher loadings of acid compounds associated with the present invention faster, without jeopardizing the maximum obtainable loading capacity.

The optimal performance of the absorption step is a balance between the concentrations at equilibrium of the acid compound in the two streams or phases passing usually in countercurrent through the absorption step, the equilibrium usually being more favourable at lower temperatures, and the mass transfer rate of the acid compound moving from one stream or phase into the other stream or phase, the latter usually being favoured at higher temperatures. The applicants have for instance found that the optimum temperatures are preferably higher when absorbing $CO_2$ is the most important performance factor, while with $H_2S$ absorption the optimum temperatures are somewhat lower. This difference is reflected in the preferred ranges mentioned herein above.

In an embodiment of the method according to the present invention, the feed stream comprises carbon dioxide and the lean absorbent solution is recycled to step a) at a temperature of at least 25° C., preferably at least 30° C., more preferably at least 35° C., even more preferably at least 40° C. The applicants have found that these temperatures are more suitable for reaching the higher loadings of carbon dioxide associated with the present invention.

In an embodiment of the method according to the present invention, the feed stream comprises hydrogen sulphide and the lean absorbent solution is recycled to step a) at a temperature of at most 40° C., preferably at most 35° C., more preferably at most 30° C., even more preferably at most 25° C., yet more preferably at most 20"C, and optionally at least 15° C., preferably at least 20° C., more preferably at least 25° C. The applicants have found that these temperatures are more suitable for reaching the higher loadings of hydrogen sulphide, associated with some embodiments of the present invention faster, without jeopardizing the maximum obtainable loading capacity.

In an embodiment of the method according to the present invention, the enriched absorbent solution is obtained from step a) at a temperature in the range of 50-100° C., preferably at most 95° C., more preferably at most 90° C., and preferably at least 60° C., more preferably at least 70° C. The applicants have found that these temperatures are more suitable for maintaining the higher loadings in acid compounds which are associated with the present invention.

In an embodiment of the method according to the present invention, the enriched absorbent solution obtained from step a) is introduced into step b) at a temperature in the range of 80-150° C., preferably at least 80° C., more preferably at least 90° C., even more preferably at least 100° C., yet more preferably at least 110° C., preferably at least 115° C., more preferably at least 120° C., even more preferably at least 125° C. The applicants have found that this helps in the performance of the regeneration step b).

In an embodiment of the method according to the present invention, at least part of the lean absorbent solution is leaving the regeneration step at a temperature of at least 90° C., preferably at least 100° C., even more preferably at least 110° C., preferably at least 115° C., more preferably at least 120° C., even more preferably at least 125° C. and optionally at most 180° C., preferably at most 160° C., more preferably at most 150° C., even more preferably at most 140° C., preferably at most 130° C., even more preferably at most 120° C. The applicants have found that these temperatures are more suitable for reaching lower remaining levels of acid compounds in the lean absorbent solutions which are part of the present invention.

In an embodiment of the method according to the present invention, step b) comprises the step of stripping at least a portion of the enriched absorbent solution obtained from step a) in counter-current with a gaseous stream containing water vapour in a stripping tower, to form a tower bottom liquid stream which is a first lean absorption solution for the recycling in step c). The applicants have found that steam stripping as prescribed is a very efficient method for breaking the bonds between the acid compound and the absorbent compound, and for separating the acid compound in a gaseous form from the absorbent compound in a liquid form.

In an embodiment of the method according to the present invention, step b) comprises the step of flashing at least a portion of the enriched absorbent solution obtained from step a) to a lower pressure for releasing a gaseous stream containing the at least one acid compound from a liquid stream which is a second lean absorption solution for the recycling in step c). The applicants have found that flashing may be an even more efficient method, as compared to steam stripping, for breaking the bonds between the acid compound and the absorbent compound, and for separating the acid compound in a gaseous form from the absorbent compound in a liquid form. The applicants prefer to combine a flashing step with a downstream regeneration step, which preferably is a steam stripping step.

In an embodiment of the method according to the present invention, the second lean absorption solution is recycled to step a). The applicants have found that the flashing step may produce a second lean absorption solution which is suitable for recycling in step c) to step a). This brings the advantage that this part of the absorbent solution does not necessarily need to be processed through a more thorough regeneration step, such as by steam stripping, before it is suitable for participating in the absorption step a).

In an embodiment of the method according to the present invention, in step b) a first lean absorption solution and a second lean absorption solution are formed for the recycling in step c), whereby the second lean absorption solution contains more acid compound than the first lean absorption solution, preferably step a) being performed in an absorption tower and the first lean absorption solution being recycled to a top liquid feed tray in the absorption tower and the second lean absorption solution being recycled to an intermediate feed tray in the absorption tower located lower than the top liquid feed tray. The applicants have found that this embodiment takes full advantage of the presence of a flashing step, without increasing the risk for acid compound breakthrough in the absorption step a), because the stream in contact with the second lean absorption solution still has to pass the zone where it is contacted with the first lean absorption solution.

Conventionally, in particular when removing carbon dioxide, the carbon dioxide separated from the feed stream is seldom utilized, but rather discarded directly into the atmosphere. More and more, under the growing pressures from the global warming concerns, a useful disposition for such carbon dioxide is considered, and this may apply to any of the other acid compounds according to the present invention. A reuse of the gas stream liberated in the regeneration stage b) will be easier if the gas stream may be made available at a higher pressure.

In an embodiment of the method according to the present invention, step b) is performed at a pressure of at least 0.5 bar gauge, preferably at least 1.0 bar gauge, more preferably at least 2.0 bar gauge, even more preferably at least 3 bar gauge. The applicants have found that this brings the advantage of easing the reuse of the gas streams liberated in the regeneration step b). Such reuse may comprise re-injection of carbon dioxide and other acid compounds, removed from natural gas obtained from a natural gas field, into an underground formation or an underground aquifer. The re-use may also be a part of a tertiary oil recovery process practised in an oil field. The applicants have found that higher pressures, such as 3.5 bar gauge, and possibly up to 10 bar gauge, may be operable and very suitable under appropriate circumstances.

Figure 1:
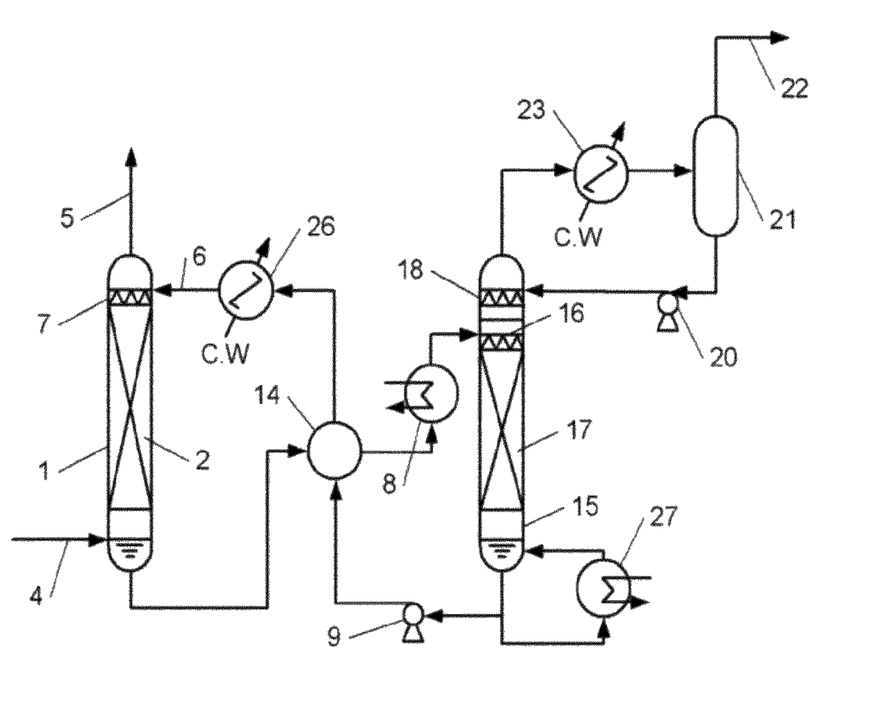
FIG. 1 shows a schematic diagram of an apparatus suitable for removing acid compounds from a gas stream.

FIG. 1 is a schematic diagram of an apparatus for removing acid compounds according to the present invention from a gaseous feed stream. As shown in FIG. 1, gas feed is led to an absorption tower 1 through an acid compound containing gas-feed inlet 4. In a packed portion 2, the gas placed in the absorption tower 1 is brought into contact in a counter flow with an absorbent liquid fed from a nozzle 7, and the acid compound is absorbed and removed from the gas by the absorbent liquid, and the resultant gas is discharged through an acid compound removed gas-discharge outlet 5. The absorbent liquid fed to the absorption tower 1 absorbs the acid compound, and is led to a heat exchanger 14 and a heater 8 and heated and led to a regeneration tower 15. In the regeneration tower 15, the absorbent liquid flows through a nozzle 16 and a packed portion 17 toward the lower portion of the tower. During this time, acid compound is removed to regenerate the absorbent liquid. A part of the absorbent liquid in the bottom of the regenerator tower is routed over reboiler 27 in order to generate a vapour stream for stripping the absorbent liquid coming down the tower. The regenerated absorbent liquid is led by a pump 9 to the heat exchanger 14 and an absorbent liquid cooler 26 and fed back to the absorption tower 1 through an absorbent liquid feed inlet 6.

On the other hand, in the upper portion of the regeneration tower 15, the acid compound removed from the absorbent liquid is brought into contact with a reflux water fed from the nozzle 18, and cooled by a regeneration tower reflux condenser 23, and, in a reflux drum 21, the gaseous acid compound is separated from the reflux water formed by condensing water vapour accompanying the acid compound, and may be led to an acid compound recovery step through a recovered acid compound line 22. The reflux water is fed by a reflux water pump 20 to the regeneration tower 15.

EXAMPLES

Example 1

Absorption Performance

Preparation of the Test Solutions

The solutions A, B, C and D were prepared to be used as solvents for $CO_2$ in a gas sweetening process. Solution A was considered as being the reference solution.

A reference solution A was prepared containing 43% wt (3.79 mol/L) of methyldiethanolamine (MDEA) and 7% wt (0.85 mol/L) of piperazine, in water as the solvent.

Solution B was prepared containing 43% wt (2.68 mol/L) of N,N,N'-trimethyl-N'-(hydroxyethyl)-1,3-propane diamine and 7% wt (0.81 mol/L) of piperazine, in water as the solvent.

Solution C was prepared containing 20% wt (0.75 mol/L) of tris(N,N,-dimethylamino propyl)amine, 25% wt (2.13 mol/L) of methyl diethanol amine and 5% wt (0.59 mol/L) of piperazine, in water as the solvent.

Solution D was prepared containing 50% wt (2.02 mol/L) of N-(3-aminopropyl)-N-(dimethylamino)propyl-N',N'-dimethyl-1,3-propanediamine, in water as the solvent.

Gas containing $CO_2$ was pumped to solutions A, B, C and D, when present in a static cell apparatus as described below. Through measurements of pressure, temperature and volumes, the exact loading is determined for the different conditions of temperature and $CO_2$ partial pressure. This operation was conducted at the selected partial pressures for $CO_2$ of 1.6 bar, 8 bar and 24 bar (absolute).

Vapour-Liquid Equilibrium (VLE) Tests

For these measurements, use was made of a static cell apparatus. Its equilibrium cell is submerged in a thermostatic oil bath. Its content may be stirred using a magnetic stirrer. Before a test, the cell content was evacuated by pulling vacuum. The purified and degassed solvents were charged into the cell as compressed liquids using thermostatted piston injectors, which allow the precise recording of volume differences. Then, the gas is added stepwise using a thermo-regulated gas bomb. Knowing the pressure, temperature, and volume of the gas bomb, the amount of gas inside the bomb may be calculated using correlated thermodynamic property data of the gas. Thus, the injected amount of gas may be obtained from the pressure difference in the bomb before and after each injection. The pressure inside the cell is measured with a pressure sensor.

Because only temperature, pressure, total loadings and total volumes are measured or known, the compositions of the coexisting phases have to be determined by evaluation of the raw data. From the known amount of solvent, the liquid phase volume is determined using precise information about the density of the liquid solution inside the equilibrium chamber. From the total volume of the cell, the remaining gas phase volume may then be calculated precisely. At given equilibrium conditions (temperature, gas phase volume and gas pressure) the amounts of gas in the gas phase and thus, also in the liquid phase are obtained. In this approach, several factors have influence on the resulting liquid phase compositions and on the derived VLE results. These factors are for instance the small amounts of solvents in the gas phase, the compressibility of the solvent under the gas pressure, the partial molar volume of the dissolved gas and the solvent activity coefficient. All these factors are considered in an iterative isothermal and isochoric algorithm by solving the mass and volume balances for each experiment.

Measurements were made of the $CO_2$ loadings of the solutions, at the temperatures of T°=60° C., representative of a rich absorbent solution, and T°=120° C., representative for the lean absorbent solution. From these results, the difference in loading ("Δloading", expressed in grams of $CO_2$ per litre solution or "g $CO_2$/L") between the rich and the lean solution was calculated, according to the following formula:

Δloading=(g/L $CO_2$ loading at $T$=60° C.)−(g/L $CO_2$ loading at $T$=120° C.)

For each of the test solutions B, C, D, the Δloading was than expressed as a percentage relative to this obtained for the reference solution A. These relative performances, as compared to the reference solution A, are shown in Table 1.

TABLE 1

| Partial pressure CO2 (bar) | Solution | Δloading | % of A |
| --- | --- | --- | --- |
| 1.6 | A | 93 | — |
|  | B | 129 | 139% |
|  | C | 160 | 172% |
|  | D | 168 | 181% |
| 8 | A | 159 | — |
|  | B | 197 | 124% |
|  | C | 192 | 121% |
|  | D | 214 | 135% |
| 24 | A | 191 | — |
|  | B | 242 | 126% |
|  | C | 225 | 118% |
|  | D | 254 | 133% |

The results show that the solvents B, C and D all achieve a significantly higher Δloading as compared to the reference solvent A, thus demonstrating a better performance, and this over a wide range of $CO_2$ partial pressure conditions. All three solutions are therefore outperforming MDEA as the reference component.

Example 2

Phase Separation at Elevated Temperature

The solutions E, F and G were prepared as to be used as absorbents for $CO_2$ in a gas sweetening process.

Solution E was prepared containing 15% wt methyldiethanolamine (MDEA) and 35% wt tris(N,N,-dimethylamino propyl)amine in 50% water as the carrier, hence in a weight ratio (for MDEA/the other amine) of 30:70.

Solution F was prepared containing 10% wt methyldiethanolamine and 40% wt tris(N,N,-dimethylamino propyl)amine in 50% water, hence in a weight ratio of 20:80.

Solution G was prepared containing 50% wt tris(N,N,-dimethylamino propyl)amine in 50% wt water as the carrier.

The solutions E, F and G were put in an oven at a temperature of 120° C. to test them for phase separation at elevated temperature. No phase separation of the absorbent solution into two liquid phases was observed with solution E. Solutions F and G showed a phase separation of the absorbent solution into two liquid phases.

These results clearly show that with tris(N,N,-dimethylamino propyl)amine, using the absorption compound in a mixture with MDEA, and in an MDEA presence giving a weight ratio of above 20:80 with the other amine, is able to avoid the risk for cumbersome phase separation of the absorbent liquid stream at elevated temperatures, even at the high amine concentrations which were tested.

Having now fully described this invention, it will be appreciated by those skilled in the art that the invention can be performed within a wide range of parameters within what is claimed, without departing from the scope of the invention, as defined by the claims.

The invention claimed is:

1. A method for deacidising a gaseous feed stream comprising at least one acid compound of the group consisting of hydrogen sulphide, $H_2S$, carbon dioxide, $CO_2$, carbon oxysulphide, COS, carbon disulphide, $CS_2$, disulphides and mercaptans, the method comprising steps
    a. an absorption step wherein the feed stream is contacted in countercurrent with an aqueous absorbent solution and forming a product stream having a reduced acid compound content and a liquid absorbent solution enriched with the at least one acid compound,
    b. a regeneration step wherein the enriched absorbent solution obtained from step a) is treated to release at least part of the acid compound, thereby forming a regenerated liquid absorbent solution lean in the acid compound and a gaseous stream containing the at least one acid compound, and
    c. recycling at least part of the lean absorbent solution from step b) as at least part of the aqueous absorbent solution to step a),
        characterised in that step a) is performed at a pressure of at least 5.0 bar gauge, and the absorbent solution comprises an absorbent selected from the group consisting of
    N,N,N'-trimethyl-N'(hydroxyethyl)-1,3-propanediamine,
    N-(3-aminopropyl)-N-(dimethylamino)propyl-N',N'-dimethyl-1,3-propanediamine, and
    a mixture of methyl diethanol amine, MDEA, with tris (N,N-dimethylamino propyl)amine in a weight ratio in the range of 25:75 to 95:5,
    and mixtures thereof.

2. The method according to claim 1 wherein the lean absorbent solution contains from 20 to 60% by weight of the absorbent.

3. The method according to claim 1 wherein the lean absorbent solution further comprises an accelerator for the reaction of the absorbent with at least one of the acid compounds.

4. The method according to claim 3 wherein the lean absorbent solution contains 0.5 to 40% by weight of the accelerator.

5. The method according to claim 3 wherein the accelerator is selected from the group consisting of amines, alcohols, ketones, vinyl alcohols, vinyl ketones, ether alcohols, ether ketones, glycols, polyethylene glycols, polypropylene glycols, ethylene glycolpropylene glycol copolymers, glycol ethers, thioglycols, thioalcohols, sulfones, sulfoxide, N-alkylated pyrrolidones, N-alkylated piperidones, cyclotetramethylenesulfones, N-alkylformamides, N-alkylacetamides, alkyl phosphates, alkylene carbonates and/or dialkyl carbonates, and combinations or mixtures thereof.

6. The method according to claim 1 wherein the absorbent solution comprises a mixture of methyl diethanol amine, MDEA, with tris(N,N,-dimethylamino propyl)amine in a weight ratio in the range of at least 30:70 to 95:5.

7. The method according to claim 1 wherein the lean absorbent solution further comprises a substituted or unsubstituted tetramethylene sulphone or sulpholane.

8. The method according to claim 1 wherein step a) is performed at a pressure of at least 7.0 bar gauge.

9. The method according to claim 1 wherein step a) is performed at a pressure of at most 150 bar gauge.

10. The method according to claim 1 wherein the feed stream comprises carbon dioxide, and wherein the partial pressure of $CO_2$ in the feed stream to step a) is at least 50 kPa.

11. The method according to claim 1 wherein the sum of the partial pressures of the acid compounds in step a) is at least 50 kPa.

12. The method according to claim 1 wherein the feed stream is a gas stream which also comprises at most 4.5% by volume of oxygen, $O_2$.

13. The method according to claim 1 wherein the feed stream is a gas stream which also comprises at most 2.0% by volume of compounds selected from sulphur oxides, SOx, nitrogen oxides, NOx, hydrogen chloride, HCl, and mixtures thereof.

14. The method according to claim 1 wherein the feed stream also comprises at most 80% by volume of nitrogen, $N_2$.

15. The method according to claim 1 wherein the feed stream also comprises at least 5% by volume of combustible components.

16. The method according to claim 1 wherein the feed stream also comprises at least 5% by weight of combustible components.

17. The method according to claim 1 wherein the lean absorbent solution is recycled to step a) at a temperature in the range of 20-60° C.

18. The method according to claim 1 wherein the feed stream comprises carbon dioxide and the lean absorbent solution is recycled to step a) at a temperature of at least 25° C.

19. The method according to claim 1 wherein the feed stream comprises hydrogen sulphide and the lean absorbent solution is recycled to step a) at a temperature of at most 40° C.

20. The method according to claim 1 wherein the enriched absorbent solution is obtained from step a) at a temperature in the range of 50-100° C.

21. The method according to claim 1 wherein the enriched absorbent solution obtained from step a) is introduced into step b) at a temperature in the range of 80-150° C.

22. The method according to claim 1 wherein at least part of the lean absorbent solution is leaving the regeneration step at a temperature of at least 90° C.

23. The method according to claim 1 wherein step b) comprises the step of stripping at least a portion of the enriched absorbent solution obtained from step a) in counter-current with a gaseous stream containing water vapour in a stripping tower, to form a tower bottom liquid stream which is a first lean absorption solution for the recycling in step c).

24. The method according to claim 1 wherein step b) comprises the step of flashing at least a portion of the enriched absorbent solution obtained from step a) to a lower pressure for releasing a gaseous stream containing the at least one acid compound from a liquid stream which is a second lean absorption solution for the recycling in step c).

25. The method according to claim 24 wherein the second lean absorption solution is recycled to step a).

26. The method according to claim 25 wherein in step b) a first lean absorption solution and a second lean absorption solution are formed for the recycling in step c), whereby the second lean absorption solution contains more acid compound than the first lean absorption solution.

27. The method according to claim 26 wherein step b) is performed at a pressure of at least 0.5 bar gauge.

* * * * *